E. T. ROBINSON.
CANOPY FOR AUTOMOBILES.
APPLICATION FILED FEB. 11, 1908.
905,001.
Patented Nov. 24, 1908.
3 SHEETS—SHEET 1.
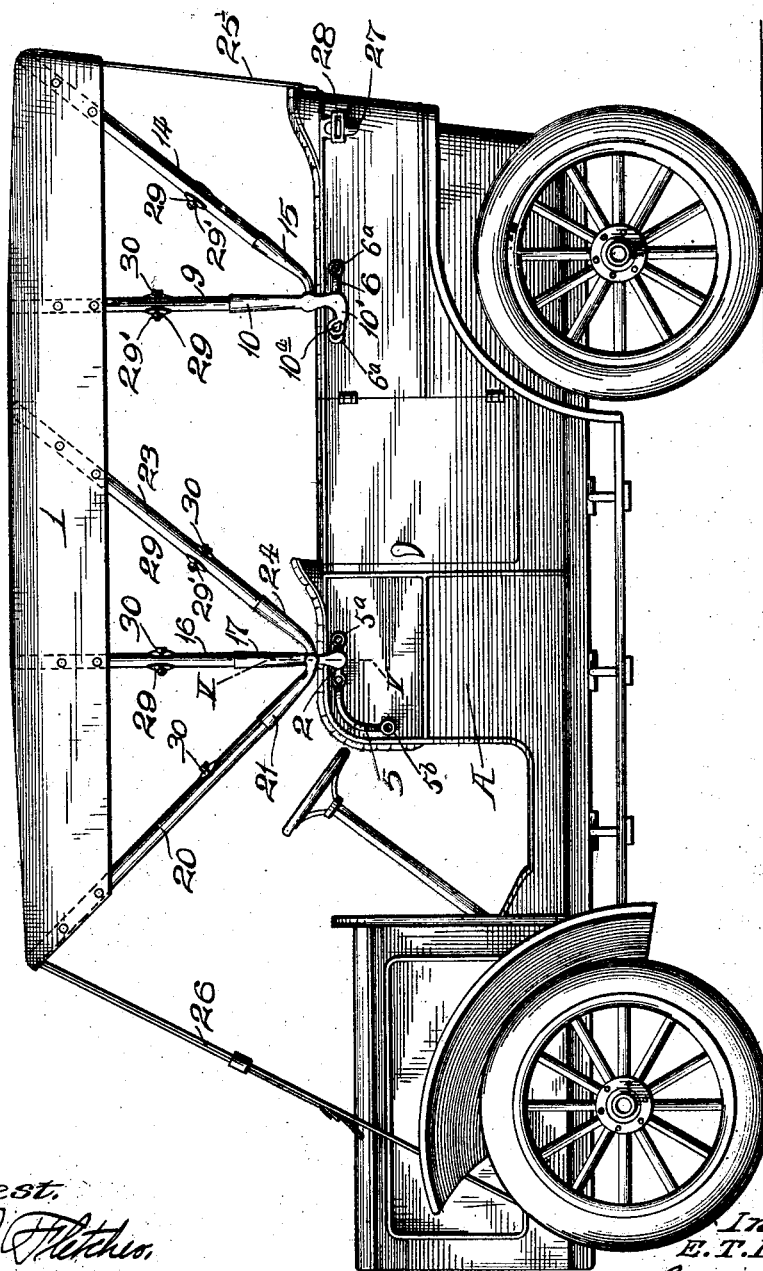

E. T. ROBINSON.
CANOPY FOR AUTOMOBILES.
APPLICATION FILED FEB. 11, 1908.
No. 905,001.
Patented Nov. 24, 1908.
3 SHEETS—SHEET 2.
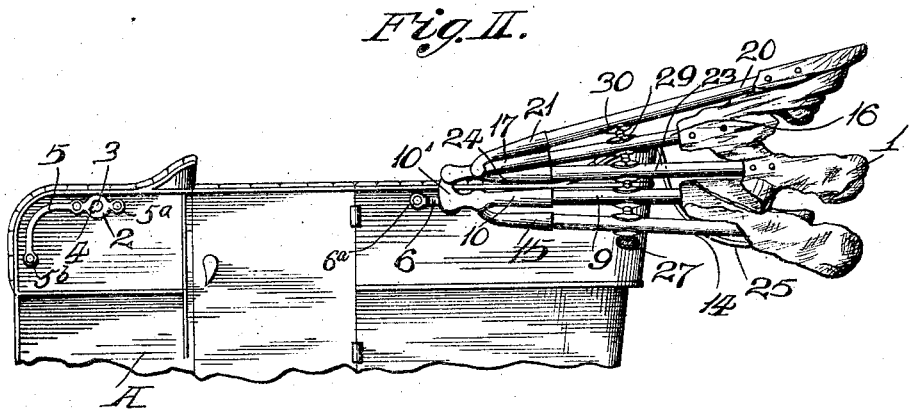
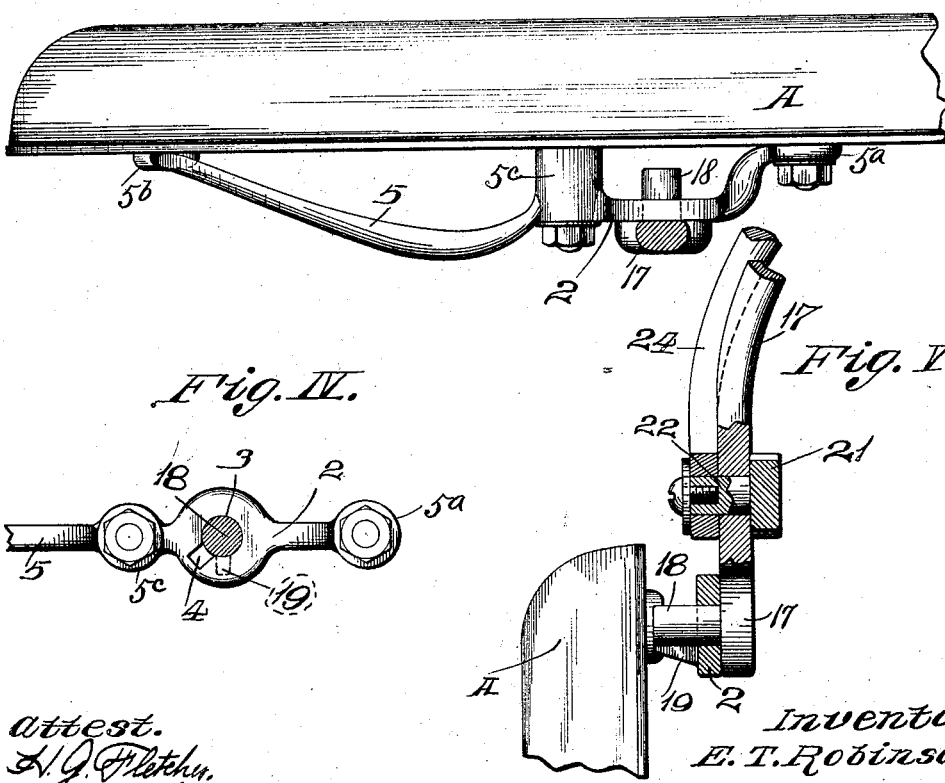
Inventor.
E. T. Robinson.

E. T. ROBINSON.
CANOPY FOR AUTOMOBILES.
APPLICATION FILED FEB. 11, 1908.
905,001.
Patented Nov. 24, 1908.
3 SHEETS—SHEET 3.
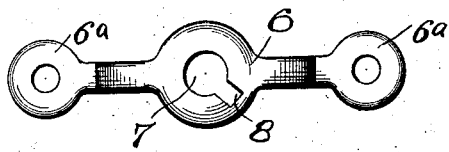
Fig. VI.
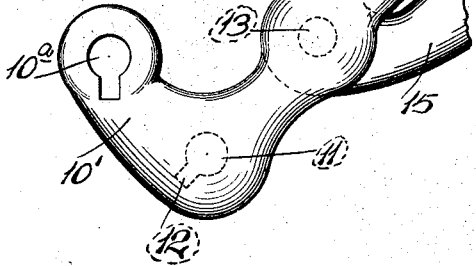
Fig. VII.
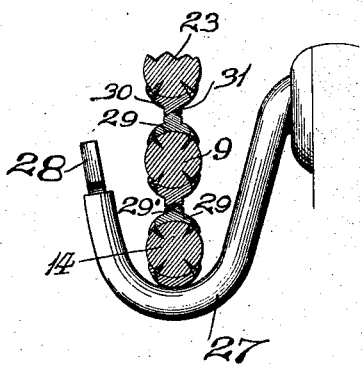
Fig. VIII.
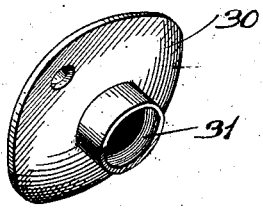
Fig. IX.
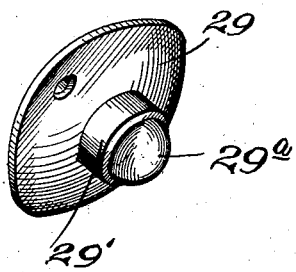
Fig. X
Attest.
H. J. Fletcher.
Blanche Hogan.
Inventor.
E. T. Robinson.
By Cartwright
Att'y.

UNITED STATES PATENT OFFICE.

EDWARD T. ROBINSON, OF ST. LOUIS, MISSOURI, ASSIGNOR TO ST. LOUIS CAR COMPANY, OF ST. LOUIS, MISSOURI, A CORPORATION.

CANOPY FOR AUTOMOBILES.

No. 905,001.          Specification of Letters Patent.          Patented Nov. 24, 1908.

Application filed February 11, 1908. Serial No. 415,358.

*To all whom it may concern:*

Be it known that I, EDWARD T. ROBINSON, a citizen of the United States of America, residing at the city of St. Louis, in the State of Missouri, have invented certain new and useful Improvements in Canopies for Automobiles; of which the following is a full, clear, and exact description, reference being had to the accompanying drawings, forming part of this specification.

My invention relates to canopies for automobiles and it has for its object the construction of an automobile canopy which may be readily put in place upon an automobile or removed therefrom and which may be also used upon the automobile in a collapsed condition.

Figure I is a side elevation of an automobile equipped with my canopy shown in elevated position. Fig. II is a side elevation of the automobile shown in Fig. I with the canopy illustrated in a shifted and lowered or collapsed condition. Fig. III is an enlarged top or plan view of a portion of the automobile body and one of the forward brackets carried by the body and to which the front bows of the canopy are connected. Fig. IV is an enlarged elevation of one of the forward brackets shown in Fig. III.
Fig. V is an enlarged vertical section taken on line V—V, Fig. I. Fig. VI is an enlarged elevation of one of the rear brackets utilized for the support of the rear bows of the canopy. Fig. VII is an enlarged elevation of one of the bow irons by which the main rear bow of the canopy is supported. Fig. VIII is in part an enlarged cross section taken through the bows of the canopy in lowered position and the separating antifriction members carried by said bows and in part an elevation of one of the bracket arms by which the bows are supported when they are in lowered position. Fig. IX is an enlarged perspective view of one of the separating and antifriction members carried by the canopy bows, and Fig. X is a perspective view of one of the separating antifriction members that mates with the members of the form shown in Fig. IX.

In the accompanying drawings: A designates the body of an automobile.

1 designates a canopy cover that is supported above the automobile body A by forward and rear bows detachably connected to said body as will hereinafter appear.

2 designates horizontal longitudinally arranged brackets that are secured to the sides of the automobile body at forward locations and which are provided with transverse openings 3 extending horizontally therethrough and radial slots 4 extending outwardly and forwardly from said openings, as seen in Figs. II and IV. Each bracket 2 is provided with a forwardly and downwardly extending curved handle 5 which is adapted to be grasped by persons in entering the forward portion of the automobile. The forward brackets 2 are each formed with end eyes $5^a$ and $5^b$ and a hollow boss or sleeve $5^c$ intermediate of the eyes and providing means whereby the forward brackets 2 may be secured to the body by suitable screws or bolts.

6 designates horizontal longitudinally arranged brackets secured to the sides of the automobile body at the rear portion of said body and located in line with the horizontal forward brackets 2 and which will be hereinafter termed "rear brackets", to distinguish them from the brackets 2 which will be hereinafter termed "forward brackets". Each rear bracket 6 is provided with a central transverse opening 7 and a radial slot 8 that extends outwardly and rearwardly in the bracket from said opening. The rear brackets 6 are each formed with end eyes $6^a$ providing means whereby they may be screwed to the automobile body.

9 designates the main or forward rear bow of my canopy and 10 are bow irons in which the ends of said bow are mounted. Each of the bow irons 10 is provided with a stem 11, see dotted lines, Fig. VII, that projects inwardly from the iron and at the bottom of which is a radial feather 12. The stems and radial feathers of the bow irons 10 are adapted to be passed through the openings 7 and radial slots 8 of the rear brackets 6 when the bow 9 is tilted forwardly from a vertical position to permit the passage of the radial feather of each rear stem through the slot in each bracket and after the stems have been thus introduced the bow 9 is elevated to vertical position and the radial feathers 12 are moved so that they are out of registration with the radial slots in the rear brackets. Each bow iron 10 is provided at its inner side with a pivot stud 13 located above its lower end, see dotted lines, Fig. VII.

14 is a back bow and 15 are back bow irons to which the ends of the bow 14 are fitted. The bow irons 15 are pivoted to the bow irons 10 by fitting them to the pivot studs 13 of the last named bow irons. At the lower end of the bow iron 10 is a forwardly projecting transverse arm 10′ that contains a key hole shaped opening 10ª that is adapted to receive a member to be hereinafter more particularly referred to.

16 designates a central or intermediate front bow of the canopy and 17 are bow irons to which the ends of said bow 16 are fitted. The bow irons 17 are provided at their inner sides and near their lower ends with stems 18 that are adapted to seat in the openings 3 of the brackets 2, and at the lower sides of said stems are radial feathers 19 which are adapted to be passed through the radial slots 4 in said forward brackets when the central bow 16 is inclined backwardly during the mounting of the canopy but which radial feathers are adapted to occupy the position illustrated in Fig. IV and out of registration with the radial slots 4, when said bow is in upright position, thereby causing the bow irons to be held to the forward brackets.

20 is a forward front bow that is located in advance of the central front bow 16 and which is fitted to bow irons 21 that are provided at their lower ends with studs 22 which are pivotally mounted in the bow irons 17 of the central bow.

23 is a front bow located back of the central front bow and fitted to bow irons 24 which are loosely mounted upon the studs 22 of the bow irons 21, as seen in Fig. V.

25 designates a flexible strap sheet or other connection member by which the rear end of the canopy cover 1 is united to the automobile body A.

26 is a strap or other flexible connection member by which the forward end of the canopy cover 1 is united to the automobile body.

When it is desired to lower my canopy from the position in which it is seen in Fig. I to the folded position in which it is seen in Fig. II, the operation is carried out as follows: The connection member 26 is first disconnected from either the canopy cover or body of the automobile, thereby freeing said cover from restraint at its forward end and the forward bow 20 is folded back against the central front bow 16 and said central front bow is tilted backwardly sufficiently to permit of the withdrawal of the stems 18 of the bow irons 17 from the forward brackets 2 while the radial feathers of said stems are in alinement with the radial slots 4 in said brackets. The central front bow is then folded together with the forward bow 20 to the bow 23 and the entire set of front bows are moved backwardly until the bow irons 17 of the central front bow are brought to the arms 10′ of the rear bow irons 10. The stems 18 of the front bow irons 17 are then passed through the key hole shaped openings 10ª in said arms 10′ to connect the set of front bows to said bow irons 10 and to provide for the interlocking of the bow irons 17 with the bow irons 10. The two sets of the bows of the canopy may then be lowered so that the canopy is folded, as seen in Fig. II. When it is desired to entirely remove the canopy from the automobile body, the entire canopy is tilted forwardly in its folded condition, thereby permitting the withdrawal of the stems 11 and their radial feathers 12 of the bow irons 10 through the rear brackets 6. This connection of the bow irons 10 from the rear brackets 6 is possible at such time, due to the radial feathers 12 being moved into alinement with radial slots 8 in said rear brackets.

To provide for the support of the canopy when in a folded condition I mount at each side of the body of the automobile adjacent to its rear end a hook shaped bracket arm 27 located in line with the forward and rear brackets, see Figs. I, II and VIII, in which the bows of the canopy rest when the canopy is folded, as seen in Fig. II. These bracket arms are preferably provided with eyes 28 that may receive a strap or straps that are passed around the canopy bows to hold them from play when the canopy is folded.

It is very desirable in a folding canopy of the character described, to prevent abrasion of the bows, due to frictional contact between them, of the canopy when the canopy is folded and remains upon an automobile. To prevent such abrasion I apply to a part of the bows of my canopy separating plates 29 and to the remainder of the bows separating plates 30. The separating plates 29 are adapted to mate with the separating plates 30 when the canopy is folded, as seen in Fig. II, so that the plates will combinedly hold the bows apart from each other. The separating plates 29 are provided with stems 29′, see Figs. VIII and X, that terminate in rounded extremities 29ª and the separating plates 30 are provided with socket stems 31, see Figs. VIII and IX; that are adapted to receive the stems 29′, the rounded extremities of which enter into the socket stems, as seen in Fig. VIII. By the construction described, I provide not only for the separation of the canopy bows to prevent abrasion thereof, but also so fit the separating plates to each other as to prevent lateral movement of any of the bows relative to the other bows when the canopy is folded and confined in a folded condition.

I claim:

The forward horizontal bracket formed with a transverse keyhole opening, a downwardly extending curved handle, end securing eyes, and a hollow securing boss located intermediate of the end eyes.

EDWARD T. ROBINSON.

In presence of—
A. DIEKMANN,
M. O. MURPHY.